United States Patent
Masuda et al.

(10) Patent No.: US 10,896,652 B2
(45) Date of Patent: Jan. 19, 2021

(54) DISPLAY CONTROL DEVICE AND LIQUID CRYSTAL DISPLAY DEVICE INCLUDING DISPLAY CONTROL DEVICE

(71) Applicant: SHARP KABUSHIKI KAISHA, Sakai (JP)

(72) Inventors: Kimihiko Masuda, Sakai (JP); Yushi Tanaka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 20 days.

(21) Appl. No.: 16/221,211

(22) Filed: Dec. 14, 2018

(65) Prior Publication Data

US 2019/0189074 A1    Jun. 20, 2019

(30) Foreign Application Priority Data

Dec. 18, 2017    (JP) .................................. 2017-241937

(51) Int. Cl.
    *G09G 3/36*    (2006.01)
    *G02F 1/1345*    (2006.01)

(52) U.S. Cl.
    CPC ....... *G09G 3/3666* (2013.01); *G02F 1/13454* (2013.01)

(58) Field of Classification Search
    CPC .......... G09G 3/3666; G09G 2340/0407; G02F 1/13454
    See application file for complete search history.

(56) References Cited

U.S. PATENT DOCUMENTS

| | | | | |
|---|---|---|---|---|
| 4,819,189 A * | 4/1989 | Kikuchi | ................... | G09G 5/14 715/797 |
| 5,499,327 A * | 3/1996 | Satoh | ....................... | G09G 5/14 345/634 |
| 5,534,940 A * | 7/1996 | Sato | ......................... | G09G 3/20 348/556 |
| 5,642,498 A * | 6/1997 | Kutner | ............... | H04N 21/4347 345/547 |
| 5,940,061 A | 8/1999 | Sato | | |
| 6,448,976 B1 * | 9/2002 | Nitta | .................... | G09G 3/3685 345/698 |
| 6,535,192 B1 * | 3/2003 | Sung | .................... | G09G 3/2011 345/94 |
| 6,608,630 B1 * | 8/2003 | MacInnis | ........... | H04N 5/44591 345/634 |
| 6,741,229 B1 * | 5/2004 | Yanagi | ................. | G09G 3/3611 345/94 |
| 7,675,497 B2 * | 3/2010 | Park | ..................... | G09G 3/3688 345/89 |

(Continued)

FOREIGN PATENT DOCUMENTS

| CN | 1104653 C | 4/2003 |
|---|---|---|
| CN | 1519805 A | 8/2004 |

(Continued)

*Primary Examiner* — Nitin Patel
*Assistant Examiner* — Robert M Stone
(74) *Attorney, Agent, or Firm* — ScienBiziP, P.C.

(57) ABSTRACT

An image data output unit includes first and second line buffers that store image data for one line in image data of first and second systems and a timing controller that alternately outputs image data for one line, which are read out from the first line buffer and the second line buffer, to a driver unit.

4 Claims, 7 Drawing Sheets

(56) References Cited

U.S. PATENT DOCUMENTS

| | | | |
|---|---|---|---|
| 8,102,401 B2* | 1/2012 | Vergnes | G09G 5/399 345/545 |
| 9,105,112 B2* | 8/2015 | Holland | G06F 1/3228 |
| 2004/0196232 A1* | 10/2004 | Kim | G09G 3/3655 345/89 |
| 2004/0233226 A1 | 11/2004 | Toriumi et al. | |
| 2005/0134546 A1* | 6/2005 | Woo | G09G 3/3688 345/100 |
| 2005/0253799 A1 | 11/2005 | Kamio | |
| 2006/0033696 A1* | 2/2006 | Nakamura | G09G 3/3677 345/100 |
| 2006/0114210 A1* | 6/2006 | Chen | G09G 3/3611 345/98 |
| 2006/0227095 A1* | 10/2006 | Kim | G09G 3/3659 345/100 |
| 2006/0279511 A1* | 12/2006 | Uh | G11C 19/184 345/100 |
| 2007/0176881 A1* | 8/2007 | Lin | G09G 3/3685 345/100 |
| 2008/0266477 A1* | 10/2008 | Lee | G11C 19/184 349/46 |
| 2009/0046044 A1* | 2/2009 | Chen | G09G 3/3688 345/87 |
| 2009/0179875 A1* | 7/2009 | Li | G09G 3/3648 345/204 |
| 2010/0177069 A1* | 7/2010 | Park | G09G 3/3685 345/204 |
| 2011/0221655 A1* | 9/2011 | Fukui | G09G 3/3611 345/4 |
| 2012/0050320 A1* | 3/2012 | Verbeque | G09G 5/14 345/629 |
| 2012/0133631 A1* | 5/2012 | Lim | G09G 3/3688 345/211 |
| 2014/0002468 A1* | 1/2014 | Sung | G09G 5/399 345/536 |
| 2014/0232731 A1* | 8/2014 | Holland | G06F 1/3228 345/531 |
| 2015/0279272 A1* | 10/2015 | Takahara | G09G 3/3266 345/76 |
| 2015/0325164 A1* | 11/2015 | Kim | G09G 3/3648 345/694 |
| 2016/0011450 A1* | 1/2016 | Li | H01L 27/3218 345/4 |
| 2016/0155421 A1* | 6/2016 | Han | G09G 5/12 345/213 |
| 2016/0189670 A1* | 6/2016 | Kim | G09G 5/02 345/690 |
| 2016/0342262 A1* | 11/2016 | Qian | G06F 3/0412 |
| 2018/0025695 A1* | 1/2018 | Han | G09G 3/3677 345/213 |

FOREIGN PATENT DOCUMENTS

| | | | |
|---|---|---|---|
| CN | 1806274 A | 7/2006 | |
| DE | 19957273 A1 * | 6/2000 | ............. G09G 5/222 |
| JP | 2000-187470 A | 7/2000 | |
| JP | 2006133512 A * | 5/2006 | |

* cited by examiner

FIG. 7

DISPLAY CONTROL DEVICE AND LIQUID CRYSTAL DISPLAY DEVICE INCLUDING DISPLAY CONTROL DEVICE

BACKGROUND

1. Field

The present disclosure relates to a display control device and a liquid crystal display device that includes the display control device.

2. Description of the Related Art

In related art, a liquid crystal display device of an active matrix (AM) type has been practically used which switches pixel electrodes aligned in a matrix manner by a thin film transistor formed on a glass substrate, thereby drives liquid crystals, and performs display.

Further, as one of an image display device, Japanese Unexamined Patent Application Publication No. 2000-187470 (laid open on Jul. 4, 2000) discloses a liquid crystal display device that manages complexity of peripheral circuits in a case where plural images are simultaneously displayed and does not request a special conversion circuit or memory.

However, a liquid crystal display device disclosed in Japanese Unexamined Patent Application Publication No. 2000-187470 has the following problem. That is, in a case where image data of two systems are output to one display panel, a cost increase accompanying increases in the numbers of terminals and channels is caused, and a common display panel which performs display by one system of each of a source driver and a gate driver may not be used.

SUMMARY

According to an aspect of the present disclosure, there is provided a display control device including: an image data output unit that receives inputs of image data of plural systems which include a first system and a second system and that outputs image data of one system; and a driver unit that drives a liquid crystal panel such that the liquid crystal panel displays an image which is represented by the image data of the one system. The image data output unit includes: a first line buffer that stores image data for one line in the image data of the first system; a second line buffer that stores image data for one line in the image data of the second system; and a timing controller that alternately outputs the image data for one line, which are read out from the first line buffer and the second line buffer, to the driver unit.

According to another aspect of the present disclosure, there is provided a liquid crystal display device including the display control device and the liquid crystal panel.

DESCRIPTION OF THE EMBODIMENTS

Embodiments of the present disclosure will hereinafter be described with reference to drawings.

First Embodiment

In the following, a first embodiment of the present disclosure will hereinafter be described with reference to FIG. 1, FIG. 2, and FIG. 7.

Configuration Example of Liquid Crystal Display Device

Figure 1:
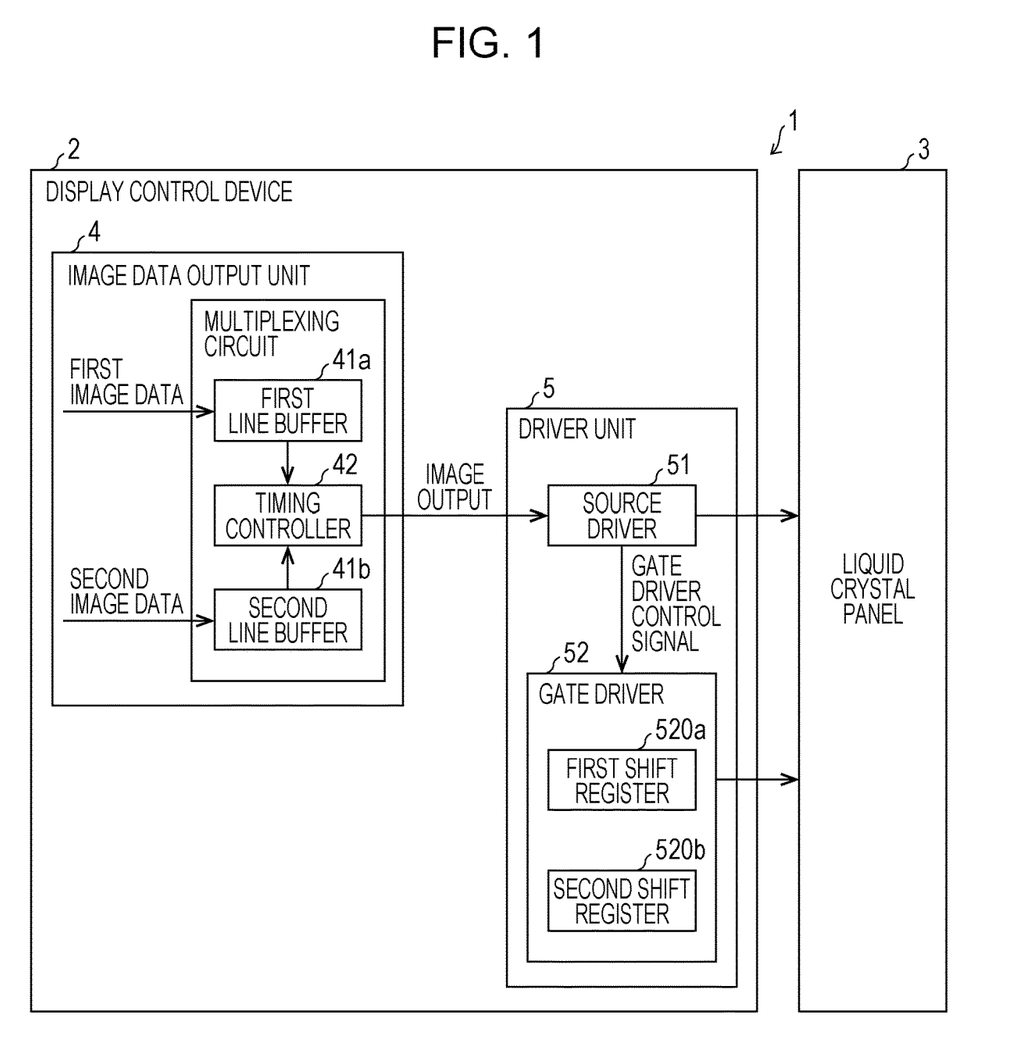
FIG. 1 is a diagram that illustrates a configuration example of a liquid crystal display device according to a first embodiment.

FIG. 1 is a diagram that illustrates a configuration example of a liquid crystal display device 1 according to the first embodiment.

As illustrated in FIG. 1, the liquid crystal display device 1 includes a display control device 2 and a liquid crystal panel 3.

Further, the display control device 2 includes an image data output unit 4 and a driver unit 5.

The image data output unit 4 receives inputs of image data of plural systems that include a first system and a second system and outputs image data of one system. The first system and the second system mentioned here each are digital signals, for example. Further, the driver unit 5 drives the liquid crystal panel 3 such that the liquid crystal panel 3 displays an image represented by the image data of the one system output by the image data output unit 4. As one example, the driver unit 5 includes one source driver 51 and a gate driver 52 that has two shift registers (a first shift register 520a and a second shift register 520b) that indicate update lines, for example.

Configuration Example of Image Data Output Unit

The image data output unit 4 includes a first line buffer 41a, a second line buffer 41b, and a timing controller 42. The first line buffer 41a stores the image data for one line in the image data of the first system (first image data). The second line buffer 41b stores the image data for one line in the image data of the second system (second image data). The timing controller 42 alternately outputs the image data for one line, which are read out from the first line buffer 41a and the second line buffer 41b, to the driver unit 5.

Further, in a case where the image data output unit 4 stores the image data in the first line buffer 41a and the second line buffer 41b, the image data output unit 4 refers to a vertical synchronization system (VSYNC) as a signal that indicates a start of one image and a horizontal synchronization signal (HSYNC) as a signal that indicates a start of one line in addition to the image data and a dot clock. The image data output unit 4 that has such a double buffer structure stores the image data, which are sent after receiving the horizontal synchronization signal, in the line buffer 41 in response to a rise or fall of the dot clock.

Note that in the following description, in a case where the first line buffer 41a and the second line buffer 41b are not particularly distinguished, those may generically be referred to as line buffer 41.

Further, as illustrated in FIG. 1, a multiplexing circuit is formed with the first line buffer 41a, the second line buffer 41b, and the timing controller 42. The multiplexing circuit is used to convert the image data of two systems into an image output of one system and to transfer the image output together with a control signal to the source driver 51 described below, for example.

The image data stored in the line buffer 41 demands that the timing controller 42 provided in the multiplexing circuit reads out the image data at the time point when the image data for one line are stored. Here, in a case of the line (first line) immediately after reception of the vertical synchronization signal, information of the vertical synchronization signal is together informed to the timing controller 42.

In a case where the timing controller 42 receives a read-out demand from the line buffer 41 and where transfer of the other image data or the image data of the previous line is finished, the timing controller 42 reads out the image data from the line buffer 41 and performs transfer to the source driver 51. In this case, the control signal that indicates which image is selected (in the following, expressed as image selection signal) is output to the source driver 51 via a data signal line before image data transfer. Further, in this case, the timing controller 42 outputs the vertical synchronization signal and the horizontal synchronization signal to the source driver 51 in a case of the first line and outputs the horizontal synchronization signal to the source driver 51 in a case of the second or subsequent line.

Configuration Example of Driver Unit

As illustrated in FIG. 1, as one example, the driver unit 5 includes one source driver 51 and the gate driver 52 that has two shift registers (the first shift register 520a and the second shift register 520b) that indicate the update lines, for example.

The source driver 51 stores the image data received from the timing controller 42 in a memory or registers (for example, the first and second shift registers 520a and 520b) and switches source signals after the data for one line are all present out. Further, the source driver 51 outputs the image selection signal, the vertical synchronization signal, and the horizontal synchronization signal among the received control signals to the gate driver 52.

The gate driver 52 performs initialization of the shift register (in a case where the first shift register 520a and the second shift register 520b are not distinguished, those may generically be referred to as shift register 520), a shift action, switching of gate signals, or the like based on the control signals from the source driver 51. The driver unit 5 is the gate driver 52 that includes two shift registers 520 and performs control such that the two shift registers 520 are caused to alternately act for lines of the image data and are used for control of the gate signal. Specifically, in a case where the gate driver 52 receives the vertical synchronization signal, the gate driver 52 performs initialization of the shift register 520 that is selected by the image selection signal.

Initialization is a process of setting the value of the register, which corresponds to the first line of the image data to be output, to one and setting the others to zero. In a case where the line is the second or subsequent line, the vertical synchronization signal is not received, and only the horizontal synchronization signal is received, the shift register 520 selected by the image selection signal is shifted by one bit. Further, the shift register 520 refers to the number of horizontal synchronization signals at a time after the vertical synchronization signal is received and thereby makes a determination of the update line.

Figure 2:
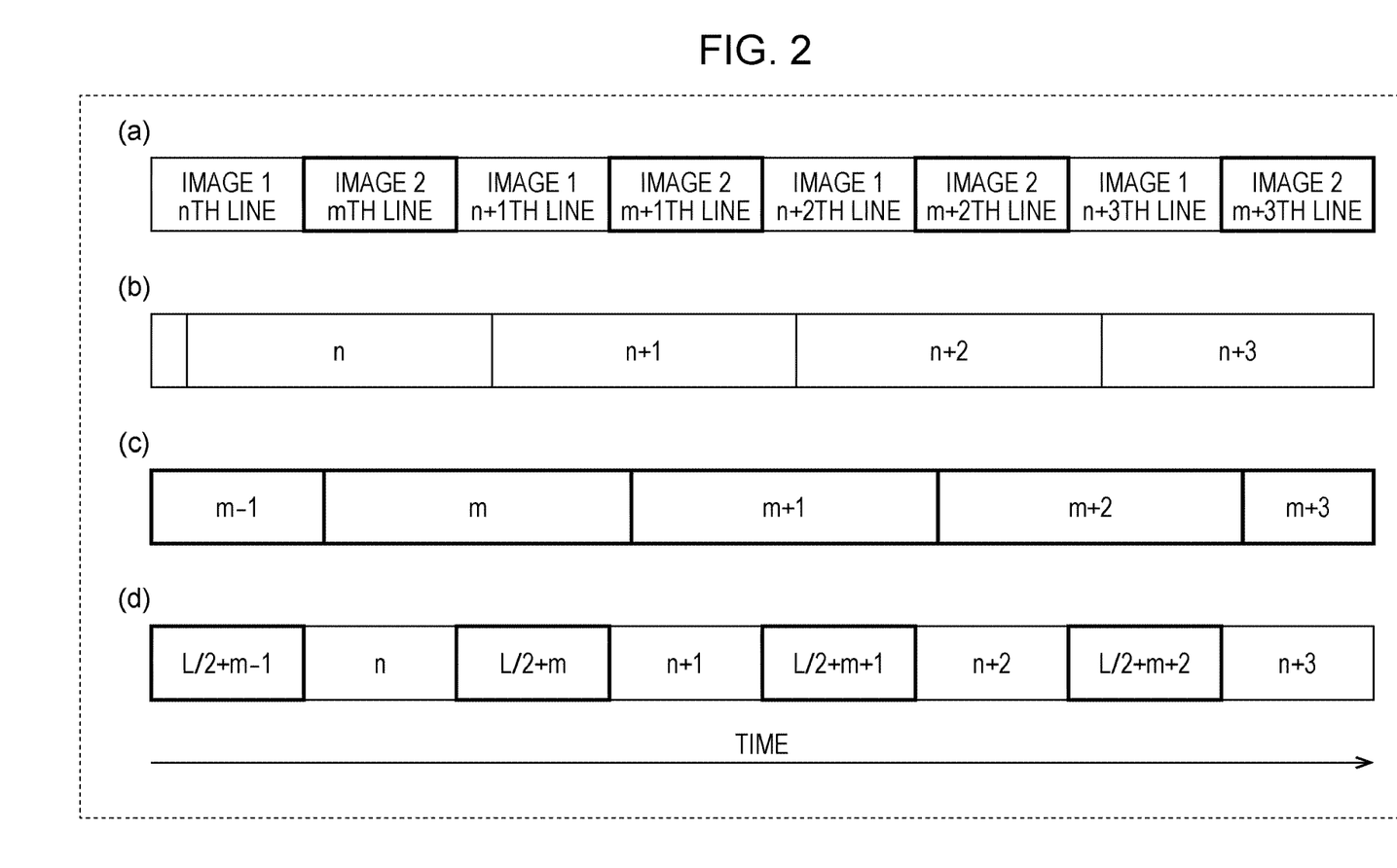
FIG. 2 is a diagram that illustrates a timing diagram of a display control device according to the first embodiment.

FIG. 2 is a diagram that illustrates one example of a timing diagram of the display control device 2 in a driving process in which the liquid crystal panel 3 which has L horizontal lines is driven such that the liquid crystal panel 3 displays an image 1 to the L/2th line and displays an image 2 in the L/2+1th and subsequent lines.

In FIG. 2, part (a) illustrates an image output that is output by the image data output unit 4, part (b) illustrates the first shift register 520a, part (c) illustrates the second shift register 520b, and part (d) illustrates the first update line. Further, the values in part (b) and part (c) in FIG. 2 indicate the bits whose values are one in the corresponding shift registers. For example, in part (b) in FIG. 2, the time interval in which "n" is indicated indicates that the nth bit of the first shift register 520a is one in this time interval. Further, in part (d) in FIG. 2, L indicates the total number of horizontal lines of the liquid crystal panel 3 as described above. Further, as indicated by the arrow in a lower portion in FIG. 2, time flows from left to right.

As illustrated in FIG. 2, the lines of the image 1 and the image 2, which are alternately output from the image data output unit 4, are respectively stored in the first shift register 520a and the second shift register 520b, and the update line which is specified by the bit which indicates "1" in the corresponding shift register is updated.

Configuration Example of Comparative Example

Figure 7:
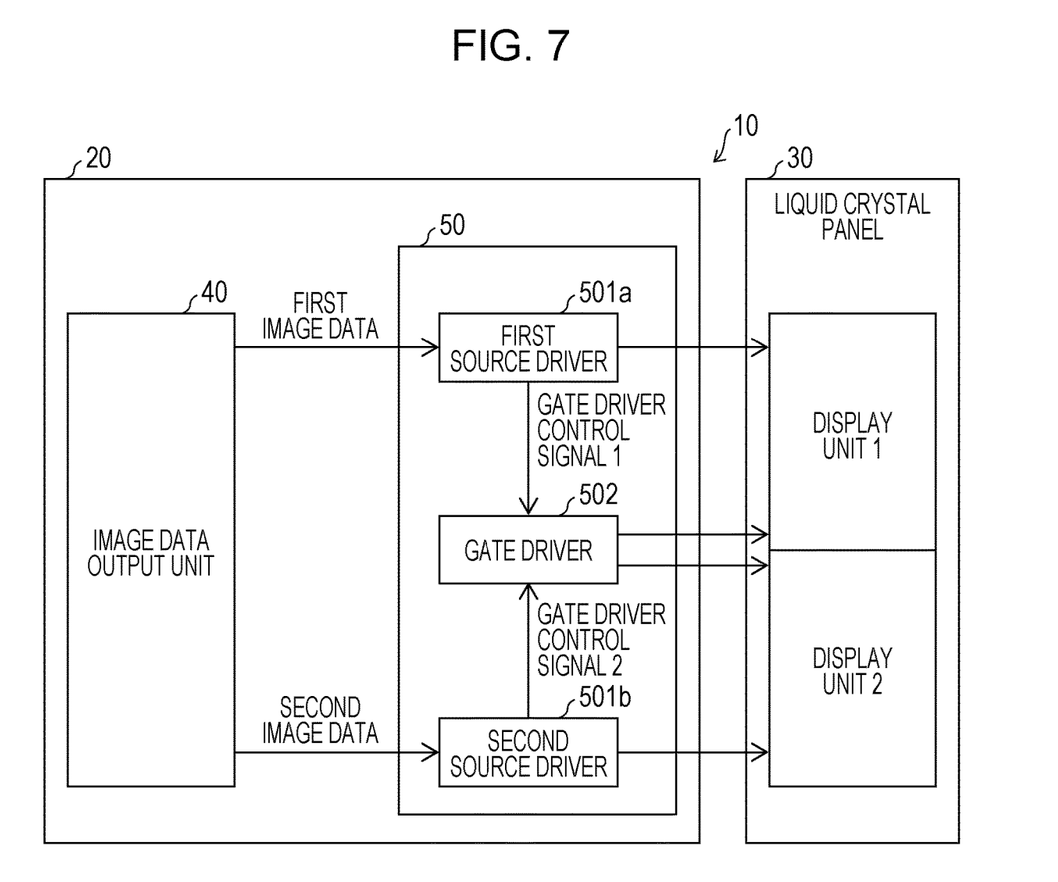
FIG. 7 is a diagram that illustrates a configuration example of a liquid crystal display device according to a comparative example.

FIG. 7 is a diagram that illustrates a configuration example of a liquid crystal display device 10 according to a comparative example. As illustrated in FIG. 7, the liquid crystal display device 10 according to the comparative example includes a display control device 20 and a liquid crystal panel 30, and the display control device 20 includes an image data output unit 40 and a driver unit 50. First image data and second image data output from the image data output unit 40 are respectively input to a first source driver 501a and a second source driver 501b. Two source drivers 501 output image data and a gate driver control signal to a gate driver 502.

Compared to the configuration of the comparative example, the driver unit 5 of this embodiment includes only one source driver and may thus suppress a cost increase by a decrease in the number of terminals of the driver unit 5 and a decrease in channels for image data. Further, in this embodiment, a common display panel may be used.

Second Embodiment

In the following, although not particularly illustrated, this embodiment will be described with reference to FIG. 1. Different points between this embodiment and the above first embodiment are a point that the timing controller includes a counter and a point that the shift registers are not provided to the gate driver. In the following, a description will be made while the different points are focused.

In a case where the timing controller 42 reads in the image data, counters are each provided for the image data of plural systems that include the first system and the second system. This counter is initialized in a case where the vertical synchronization signal is received and counts up by one at each time when the read-out demand from the line buffer 41 is received. The horizontal synchronization signal and a counter value are output as the control signals to the driver unit 5 before the image data are sent.

Specifically, the counter outputs the value that results from the addition of the number of horizontal lines included in a first region in the liquid crystal panel 3 to the counter value to the driver unit 5, and the driver unit 5 causes the liquid crystal panel 3 to display the image data in a second region that is a downstream region, in the processing order, of the first region in the liquid crystal panel 3. Here, for example, in a case where the processing order of a process of driving the liquid crystal panel 3 is an order from an upper portion to a lower portion of the liquid crystal panel 3, the first region and the second region may also be referred to as "upper screen" and "lower screen".

As a result, the gate driver 52 makes a determination of the line to be updated based on the value of the counter in the timing controller 42. Thus, without using the shift register but only by the registers for the number of lines, the gate signal is controlled such that updates of the lines that correspond to received line information are performed.

This embodiment may also provide the same effects as the above first embodiment.

Third Embodiment

In the following, a third embodiment will be described with reference to FIG. 3 and FIGS. 4A to 4C. Further, the same reference characters are given to similar configurations to the first and second embodiments, and a description thereof will not be made. In the following, a description will be made while a different point is focused.

Figure 3:
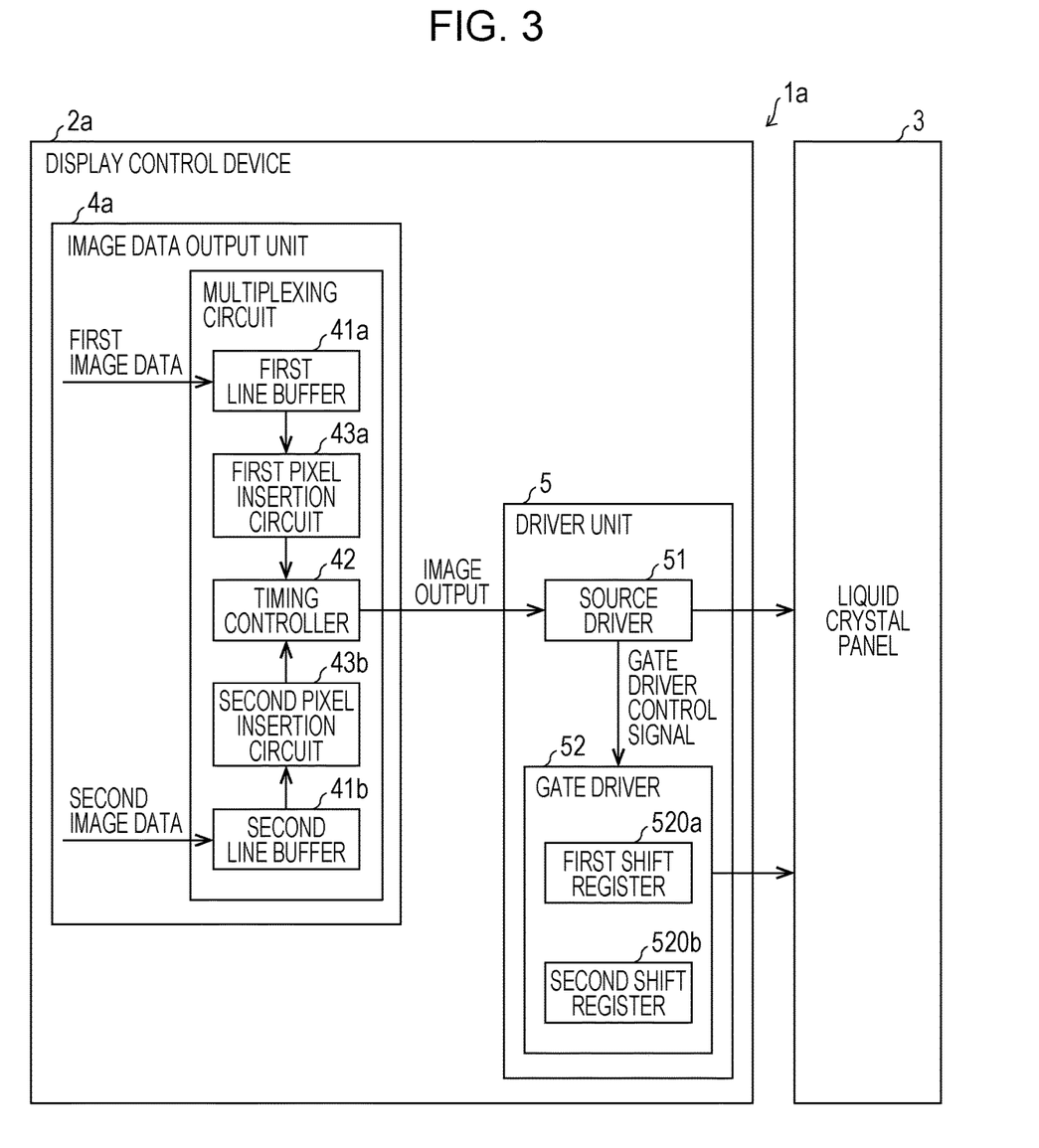
FIG. 3 is a diagram that illustrates a configuration example of a liquid crystal display device according to a third embodiment.

FIG. 3 is a diagram that illustrates a configuration example of a liquid crystal display device 1*a* according to the third embodiment. As illustrated in FIG. 3, a different point between this embodiment and the first embodiment is a point that a multiplexing circuit in a display control device 2*a* includes pixel insertion circuits 43. Thus, this embodiment is particularly suitable for a case where the numbers of pixels of two input images are different.

Specifically, a first pixel insertion circuit 43*a* and a second pixel insertion circuit 43*b* are provided to the multiplexing circuit in the display control device 2*a*. The first and second image data are each stored in the line buffers 41 in the multiplexing circuit, and thereafter in the pixel insertion circuits 43, specific pixel data are inserted in regions in which pixel data are not present due to inconsistency between the image data and the size of the liquid crystal panel. The pixel data to be inserted are set as fixed values such as black or are separately stored in a memory.

A function to recognize the time in which the data of the line which does not have the image data are safely transferable and to sequentially transfer predetermined image data in the period is added to the timing controller 42. Here, in order for the timing controller 42 to assess whether it is possible to safely perform data transfer, it is desirable to refer to pieces of information of the number of sets of data stored in the line buffers 41, the transfer rate of an image, the respective sizes of images, and V-blank and H-blank periods. Based on those pieces of information, the timing controller 42 calculates the times until the line buffers 41 in the double buffer structure break down and assesses the safe data transfer as possible in a case where the line buffers do not break down even if data for one line are sent in an interrupting manner. It is assumed that the reference for the breakdown of the line buffers is a state where the data of the next line are sent to the line buffer 41 in a state where data for two lines are stored in the line buffers 41, for example. In a case where the timing controller 42 makes a determination that the safe data transfer is possible, the timing controller 42 or the pixel insertion circuit 43 generates data for one arbitrary line and outputs the data together with the line information of the image data and the control signal such as the horizontal synchronization signal to the source driver 51.

Figure 4A:
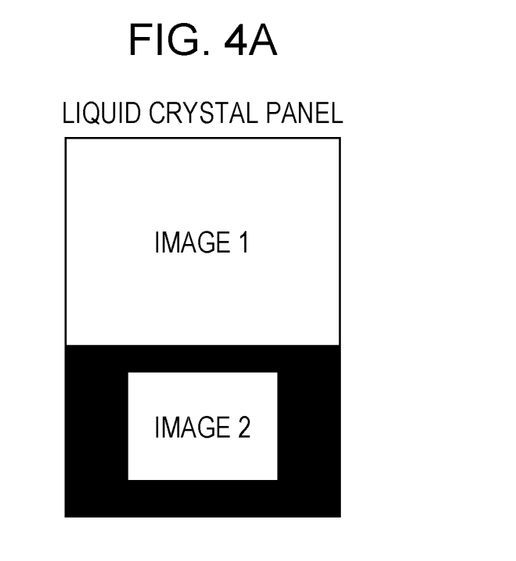
FIGS. 4A to 4C are diagrams that illustrate display examples of the liquid crystal display device according to the third embodiment.
Figure 4B:
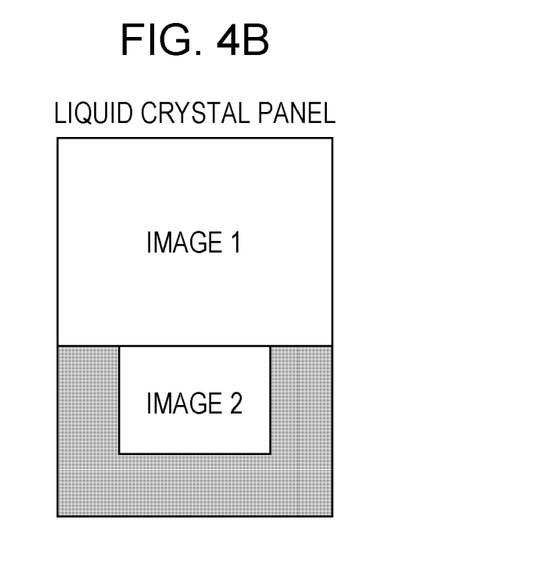
Figure 4C:
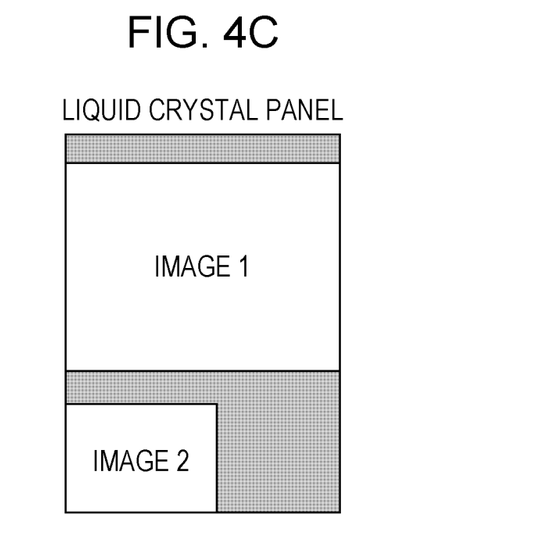

FIGS. 4A to 4C are diagrams that illustrate display examples of the liquid crystal display device according to the third embodiment.

As illustrated in FIGS. 4A to 4C, the above configuration may provide the same effects as the above embodiments, enable management of inconsistency in the number of dots or the number of lines between an image and a display unit of the liquid crystal panel, and enable use of liquid crystal panels in various sizes. Further, display becomes possible even in a case where the numbers of pixels of two input images are different. Further, the change in the display positions of the images 1 and 2 becomes possible.

Note that as the timing controller 42 and the driver unit 5 in this embodiment, the configurations described in the first embodiment may be employed, or the configurations described in the second embodiment may be employed.

Fourth Embodiment

In the following, a fourth embodiment will be described with reference to FIG. 5 and FIG. 6. Further, the same reference characters are given to similar configurations to the first to third embodiments, and a description thereof will not be made. In the following, a description will be made while a different point is focused.

Figure 5:
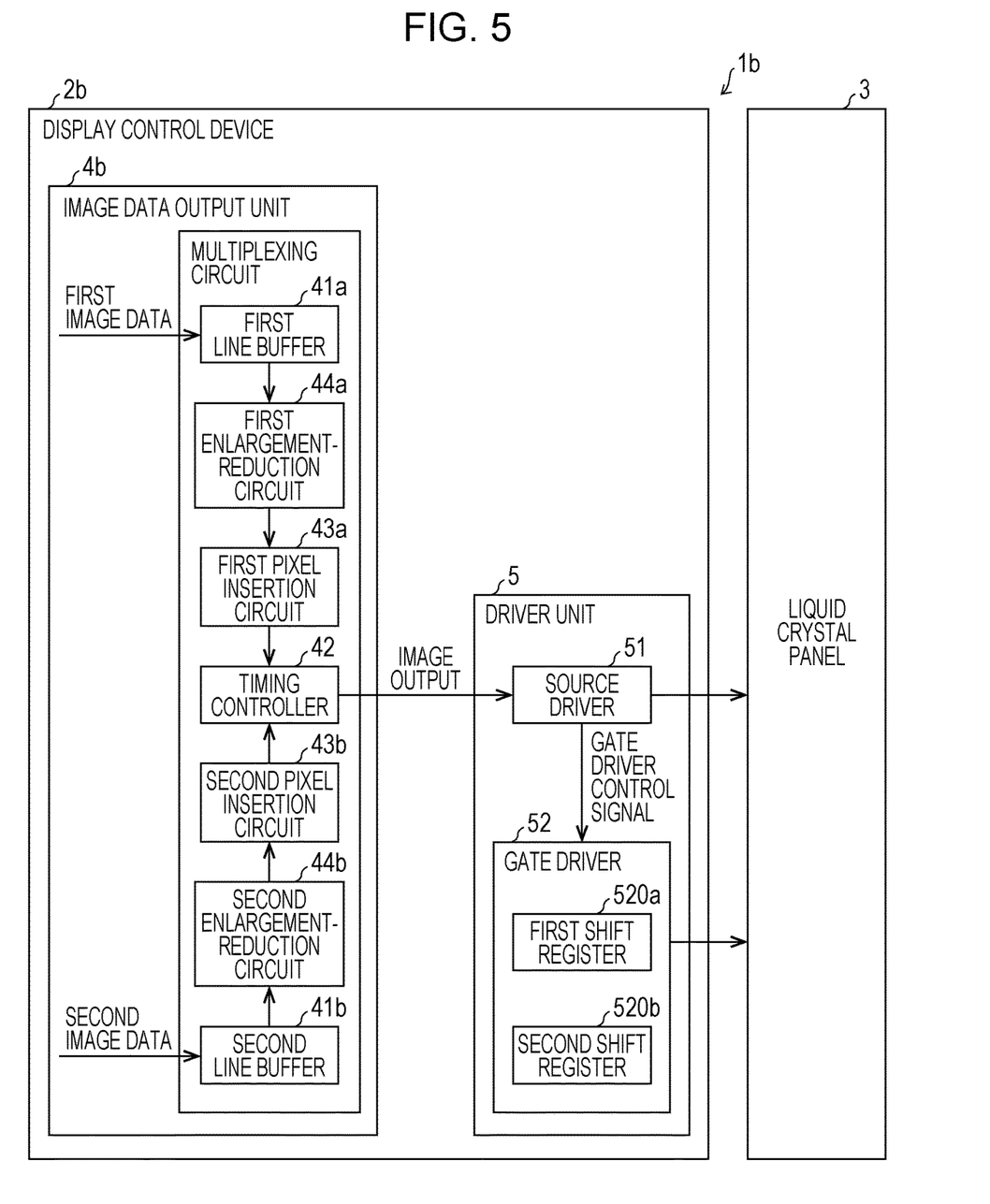
FIG. 5 is a diagram that illustrates a configuration example of a liquid crystal display device according to a fourth embodiment.

FIG. 5 is a diagram that illustrates a configuration example of a liquid crystal display device 1*b* according to the fourth embodiment. As illustrated in FIG. 5, a different point between this embodiment and the third embodiment is a point that a multiplexing circuit in a display control device 2*b* includes enlargement-reduction circuit 44. Thus, this embodiment is particularly suitable for a case where the ratio between the sizes of two input images is variable.

Specifically, the multiplexing circuit in the display control device 2*b* includes enlargement-reduction circuits 44. The image data of two systems are each stored in the line buffers 41 in the multiplexing circuit, the data about the number of lines, which are requested for enlargement and reduction of the image data, are thereafter stored in the line buffers 41, and the image data are thereafter enlarged or reduced at specified magnifications.

Figure 6:
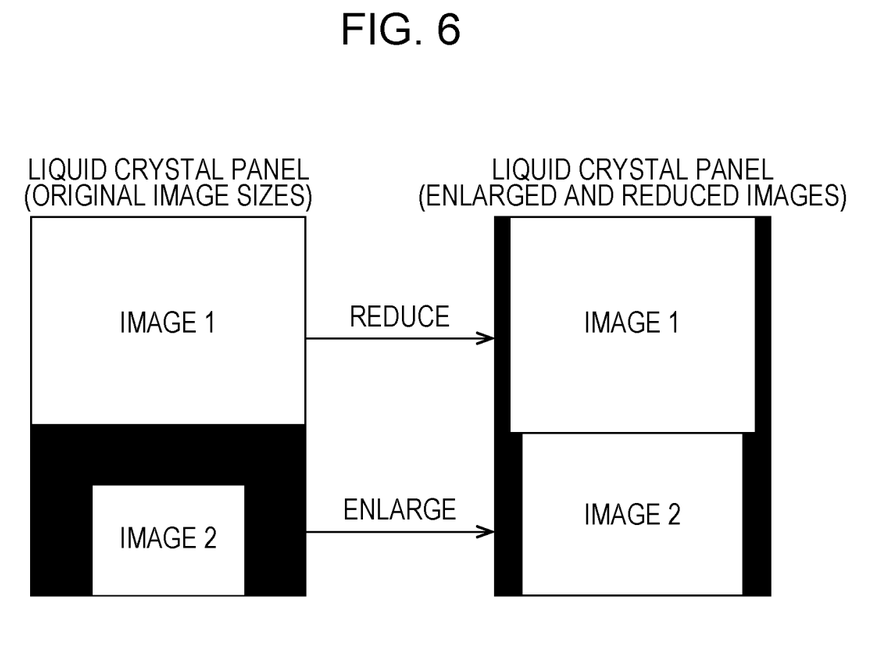
FIG. 6 is a diagram that illustrates display examples of the liquid crystal display device according to the fourth embodiment.

FIG. 6 is a diagram that illustrates display examples of the liquid crystal display device 1*b* according to the fourth embodiment.

As illustrated in FIG. 6, the above configuration may provide the same effects as the above embodiments. Further, because the ratio of the image size becomes variable, the display unit of the liquid crystal panel 3 may efficiently be used. Further, reduction of the input image becomes possible, and it thereby becomes possible to use a liquid crystal panel with a small number of pixels.

Note that as the timing controller 42 and the driver unit 5 in this embodiment, the configurations described in the first embodiment may be employed, or the configurations described in the second embodiment may be employed.

CONCLUSION

Display control devices 2, 2a, and 2b according to a first aspect of the present disclosure include: image data output units 4, 4a, and 4b that receive inputs of image data of plural systems which include a first system and a second system and that output image data of one system; and a driver unit 5 that drives a liquid crystal panel 3 such that the liquid crystal panel 3 displays an image which is represented by the image data of the one system. The image data output units 4, 4a, and 4b include a first line buffer 41a that stores image data for one line in the image data of the first system, a second line buffer 41b that stores image data for one line in the image data of the second system, and a timing controller 42 that alternately outputs the image data for one line, which are read out from the first line buffer 41a and the second line buffer 41b, to the driver unit 5.

The above aspect may provide a display control device that may suppress a cost increase and be applied to a common display panel.

The display control devices 2, 2a, and 2b according to a second aspect of the present disclosure are the display control devices 2, 2a, and 2b described in the first aspect, the image data output units 4, 4a, and 4b may further output an image selection signal that indicates the image data of which of the first system or the second system the image data to be output are, and the driver unit 5 may drive the liquid crystal panel 3 by referring to the image data that are output by the image data output units 4, 4a, and 4b and the image selection signal.

In the above aspect, the shift register may appropriately be selected by referring to the image selection signal.

The display control devices 2, 2a, and 2b according to a third aspect of the present disclosure are the display control devices 2, 2a, and 2b described in the first or second aspect, and the image data output units 4, 4a, and 4b may further output a horizontal synchronization signal HSYNC that indicates a start of one line and a vertical synchronization signal VSYNC that indicates a start of one image.

In the above aspect, the shift register for which a process is performed may appropriately be confirmed.

The display control devices 2, 2a, and 2b according to a fourth aspect of the present disclosure are the display control devices 2, 2a, and 2b described in the third aspect and may include a gate driver 52 that has a first shift register 520a and a second shift register 520b and that causes the first shift register 520a and the second shift register 520b to alternately act for lines, and the first shift register 520a and the second shift register 520b may make a determination of a line to be updated based on the number of horizontal synchronization signals HSYNC at a time after the vertical synchronization signal VSYNC is received.

In the above aspect, the line for which a process is performed may appropriately be confirmed.

The display control devices 2, 2a, and 2b according to a fifth aspect of the present disclosure are the display control devices 2, 2a, and 2b described in the third or fourth aspect, the timing controller 42 may have counters for image data of plural systems that include the first system and the second system, and the counter may be initialized in a case where the vertical synchronization signal VSYNC is received, count up a value by one at each time when a read-out demand from the line buffer 41 is received, and output the horizontal synchronization signal HSYNC and the value of the counter as control signals.

In the above aspect, the line for which a process is performed may more appropriately be confirmed.

The display control devices 2, 2a, and 2b according to a sixth aspect of the present disclosure are the display control devices 2, 2a, and 2b described in the fifth aspect, the counter may output a value that results from addition of the total number of lines in an upper screen of the liquid crystal panel 3 to the value of the counter and output the image data to a lower screen of the liquid crystal panel 3.

In the above aspect, the line for which a process is performed may certainly be confirmed.

The display control devices 2a and 2b according to a seventh aspect of the present disclosure are the display control devices 2a and 2b described in any one aspect of the first to sixth aspects, the image data output units 4a and 4b may have a pixel insertion circuit 43 that inserts specific pixel data in a region in which pixel data are not present due to inconsistency between the image data and the size of the liquid crystal panel 3, and the timing controller 42 may calculate the times until the first line buffer 41a and the second line buffer 41b break down.

In the above aspect, transfer of image data may safely be performed.

The display control device 2b according to an eighth aspect of the present disclosure is the display control device 2b described in any one aspect of the first to seventh aspects, and the image data output unit 4b may include an enlargement-reduction circuit 44 that enlarges or reduces the image data for the number of lines of enlargement or reduction in the image data at a specified magnification.

In the above aspect, a common display panel may be applied.

Liquid crystal display devices 1, 1a, and 1b according to a ninth aspect of the present disclosure may include the display control devices 2, 2a, and 2b described in any one aspect of the first to eighth aspects.

The above aspect may provide the same effects as the first aspect.

The present disclosure is not limited to the above-described embodiments. Various kinds of alternations are possible in the scope described in claims, and embodiments that are obtained by appropriately combining technical measures disclosed in the different embodiments are included in the technical scope of the present disclosure. In addition, new technical features may be formed by combining technical measures that are disclosed in the embodiments.

The present disclosure contains subject matter related to that disclosed in Japanese Priority Patent Application JP 2017-241937 filed in the Japan Patent Office on Dec. 18, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display control device comprising:
   an image data output unit that receives inputs of image data of plural systems which include a first system and a second system and that outputs image data of one system; and
   a driver unit that drives a liquid crystal panel such that the liquid crystal panel displays an image which is represented by the image data of the one system, wherein the image data output unit includes
   a first line buffer that stores image data for one line in the image data of the first system,
   a second line buffer that stores image data for one line in the image data of the second system, and
   a timing controller that alternately outputs the image data for one line, which are read out from the first line buffer and the second line buffer, to the driver unit,
the image data output unit further outputs a horizontal synchronization signal that indicates a start of one line and a vertical synchronization signal that indicates a start of one image,
the timing controller has counters for image data of plural systems that include the first system and the second system, and
the counter is initialized in a case where the vertical synchronization signal is received, counts up a value by one at each time when a read-out demand from the line buffer is received, and outputs the horizontal synchronization signal and the value of the counter as control signals to the driver unit.

2. The display control device according to claim 1, wherein
the counter outputs, to the driver unit, a value that results from addition of the number of horizontal lines which are included in a first region in the liquid crystal panel to the value of the counter, and
the driver unit causes the liquid crystal panel to display the image data in a second region that is a downstream region, in a processing order, of the first region in the liquid crystal panel.

3. A display control device comprising:
an image data output unit that receives inputs of image data of plural systems which include a first system and a second system and that outputs image data of one system; and
a driver unit that drives a liquid crystal panel such that the liquid crystal panel displays an image which is represented by the image data of the one system, wherein:
the image data output unit includes
   a first line buffer that stores image data for one line in the image data of the first system,
   a second line buffer that stores image data for one line in the image data of the second system, and
   a timing controller that alternately outputs the image data for one line, which are read out from the first line buffer and the second line buffer, to the driver unit,
the driver unit includes a gate driver that includes a first shift register and a second shift register,
initialization of each of the first shift register and the second shift register is performed individually using an image selection signal, and
each of shift operations on each of the first shift register and the second shift register after the initialization of each of the first shift register and the second shift register is controlled individually using the image selection signal; and
the image data output unit has a pixel insertion circuit that inserts specific pixel data in a region in which pixel data are not present due to inconsistency between the image data and a size of a display panel, and
the timing controller calculates the times until the first line buffer and the second line buffer break down.

4. A display control device comprising:
an image data output unit that receives inputs of image data of plural systems which include a first system and a second system and that outputs image data of one system; and
a driver unit that drives a liquid crystal panel such that the liquid crystal panel displays an image which is represented by the image data of the one system, wherein:
the image data output unit includes
   a first line buffer that stores image data for one line in the image data of the first system,
   a second line buffer that stores image data for one line in the image data of the second system, and
   a timing controller that alternately outputs the image data for one line, which are read out from the first line buffer and the second line buffer, to the driver unit,
the driver unit includes a gate driver that includes a first shift register and a second shift register,
   initialization of each of the first shift register and the second shift register is performed individually using an image selection signal, and
   each of shift operations on each of the first shift register and the second shift register after the initialization of each of the first shift register and the second shift register is controlled individually using the image selection signal;
the image data output unit further outputs a horizontal synchronization signal that indicates a start of one line and a vertical synchronization signal that indicates a start of one image, wherein
the gate driver causes the first shift register and the second shift register to alternately act for lines,
the first shift register and the second shift register make a determination of an update line by referring to the number of horizontal synchronization signals at a time after the vertical synchronization signal is received; and
the gate driver performs initialization of the first shift register if the gate driver receives a first image selection signal corresponding to the first shift register and a first vertical synchronization signal,
the gate driver performs initialization of the second shift register if the gate driver receives a second image selection signal corresponding to the second shift register and a second vertical synchronization signal,
the gate driver shifts the first shift register by one bit if the gate driver receives a third image selection signal corresponding to the first shift register and a first horizontal synchronization signal with no vertical synchronization signal,
the gate driver shifts the second shift register by one bit, if the gate driver receives a fourth image selection signal corresponding to the second shift register and a second horizontal synchronization signal with no vertical synchronization signal,
the first shift register makes a determination of an update line by referring to the number of horizontal synchronization signals at a time after the first vertical synchronization signal is received, and
the second shift register makes a determination of an update line by referring to the number of horizontal synchronization signals at a time after the second vertical synchronization signal is received.

* * * * *